(12) United States Patent
Jahr

(10) Patent No.: US 9,414,181 B2
(45) Date of Patent: Aug. 9, 2016

(54) DEVICE, COMPUTER-READABLE MEDIUM, AND METHOD FOR RETAINING SERVICES

(71) Applicant: Giesecke & Devrient America, Inc., Dulles, VA (US)

(72) Inventor: Christoph Jahr, Ashburn, VA (US)

(73) Assignee: Giesecke & Devrient America, Inc., Dulles, VA (US)

( * ) Notice: Subject to any disclaimer, the term of this patent is extended or adjusted under 35 U.S.C. 154(b) by 0 days.

(21) Appl. No.: 13/892,073

(22) Filed: May 10, 2013

(65) Prior Publication Data

US 2014/0335841 A1   Nov. 13, 2014

(51) Int. Cl.
*H04M 3/00*   (2006.01)
*H04W 4/00*   (2009.01)
*H04W 4/12*   (2009.01)
*H04W 4/26*   (2009.01)

(52) U.S. Cl.
CPC .............. *H04W 4/003* (2013.01); *H04W 4/12* (2013.01); *H04W 4/26* (2013.01)

(58) Field of Classification Search
CPC ......... H04W 4/14; H04W 68/00; H04W 4/20; H04W 4/12; H04W 24/00; H04W 4/24; H04W 4/26; H04L 67/22; H04L 67/306; H04M 3/42153
USPC .................... 455/419, 420, 466; 709/224, 225
See application file for complete search history.

(56) References Cited

U.S. PATENT DOCUMENTS

| 7,945,589 B1 | 5/2011 | Weiss et al. | |
| 2006/0052100 A1* | 3/2006 | Almgren | 455/432.1 |
| 2006/0153073 A1* | 7/2006 | Ghiware et al. | 370/230 |

(Continued)

FOREIGN PATENT DOCUMENTS

WO   2009044371 A1   4/2009

OTHER PUBLICATIONS

Korean Intellectual Property Office, International Search Report for International Application No. PCT/US2015/018385 (related to above-captioned patent application), dated May 27, 2015.

(Continued)

*Primary Examiner* — Thai Vu
(74) *Attorney, Agent, or Firm* — Drinker Biddle & Reath LLP

(57) ABSTRACT

A portable device includes a processor; a receiver configured to receive a first message, the first message comprising a notification and a first instruction; a transmitter; a display; and a module card. The module card includes a memory, which is configured to store the first message, a toolkit comprising a plurality of commands, and a second instruction. The second instruction, when executed by the processor, instructs the module card to function as an interpreter configured to interpret the first instruction. The first instruction, when executed by the interpreter, implements the plurality of commands. Implementing the plurality of commands then causes the processor to function as a display device that displays the notification on the display; a receiving device that receives an input as a response to the notification; a determining device configured to determine whether the response corresponds to a confirmation to continue services; and a sending device that sends a second message via the transmitter when the response corresponds to the confirmation to continue services, such that the second message comprises the response to the notification.

19 Claims, 5 Drawing Sheets

(56) References Cited

U.S. PATENT DOCUMENTS

| | | | |
|---|---|---|---|
| 2008/0268882 A1* | 10/2008 | Moloney | 455/466 |
| 2009/0132559 A1 | 5/2009 | Chamberlain et al. | |
| 2010/0188992 A1 | 7/2010 | Raleigh | |
| 2011/0014905 A1* | 1/2011 | Eschenauer et al. | 455/418 |
| 2011/0320562 A1* | 12/2011 | Lane | G06F 17/30563 709/217 |
| 2012/0123951 A1 | 5/2012 | Hyatt et al. | |
| 2013/0198381 A1* | 8/2013 | Caffrey | H04L 67/22 709/225 |
| 2013/0268591 A1* | 10/2013 | Chen et al. | 709/204 |

OTHER PUBLICATIONS

Korean Intellectual Property Office, Written Opinion of the International Searching Authority for International Application No. PCT/US2015/018385 (related to above-captioned patent application), dated May 27, 2015.

* cited by examiner

DEVICE, COMPUTER-READABLE MEDIUM, AND METHOD FOR RETAINING SERVICES

TECHNICAL FIELD

The present disclosure relates to a device, computer-readable medium, and method for retaining services.

BACKGROUND

Contemporary portable devices, such as mobile phones, permit users to communicate with a service provider over a network. Portable devices frequently include mobile equipment (ME) and a module card. The ME is the hardware of the portable device, which includes a display, a receiver, a transmitter, and other physical equipment. The ME is identified by a unique code. The module card stores the unique code that identifies the ME in a memory.

In existing portable devices, the module card serves as a network interface that connects the portable device to the network. In more sophisticated portable devices, the module card contains a toolkit, which consists of a set of commands that are programmed into the module card. In such devices, the module card functions as an interpreter that is equipped to run applications written in one or more programming languages. Moreover, in such devices, the module card includes a memory that stores these applications along with other information. Such other information frequently corresponds to the unique code identifying the ME.

Today, many portable devices are connected to a Global System for Mobile Communication ("GSM") network or another wireless network. In particular, GSM is a standard set that describes protocols used in digital wireless communications among portable device users, service providers, and other parties. In such a network, the module card is a Subscriber Identity Module ("SIM") card; the toolkit on the module card is a SIM Toolkit ("STK"); and the module card functions as a STK interpreter. In more sophisticated SIM cards, the STK is a Dynamic SIM Toolkit ("DSTK") and the STK interpreter is a DSTK interpreter.

In a wireless network, a service provider generates content corresponding to a message that is to be sent to a user. Such messages are often written in a markup language (for example, Wireless Internet Gateway Wireless Markup Language ("WIG WML"), SIM @lliance Toolbox Markup Language ("S@TML"), Java Markup Language ("JavaML")). The content is sent to a gateway, which prepares the message and forwards the message to the user. This gateway is known as the Universal Gateway ("UG"). The message includes an instruction, which itself is a SIM card application (for example, a wiblet, a s@tlet, a Java applet) that is received by a portable device belonging to the user. The portable device contains a SIM card including its own memory, which stores a DSTK. Properly programmed, the SIM card functions as a DSTK interpreter, which is configured to interpret the instruction contained in the message. Depending on whether the instruction comprises a wiblet, a s@tlet, or a Java applet, the DSTK interpreter functions as SmartTrust Wib ("Wib"), a SIM @lliance Toolbox ("S@T") interpreter, or a Java interpreter, respectively. The DSTK interpreter interprets the instructions to implement actions or commands included in the DSTK. Some of these commands operate independently of the portable device, and other commands are directed to the portable device, such as a command to display a string of text or ask the user for an input.

In certain wireless networks, users are required to periodically use their portable devices in order to retain services that are being provided by a service provider. In such networks, when a user fails to use their portable device at least once during a predefined period, then the user often is no longer be able to use and receive services from the service provider. Moreover, after the user loses access to the services provided, the user often is not be able to communicate with the service provider to reinstate the services.

As more users connect to service providers over wireless networks and the size of these networks increase, it becomes increasingly important from an efficiency and cost standpoint for service providers to monitor the frequency that users are using their services. By monitoring usage, a service provider may be equipped to aid users with retaining desired services.

SUMMARY OF THE INVENTION

According to an embodiment of the present invention, a portable device includes a receiver configured to receive a first message, the first message including a notification and a first instruction; a processor; a transmitter; a display; and a module card. The module card includes a memory configured to store the first message, a toolkit including a plurality of commands, and a second instruction. The second instruction, when executed by the module card, instructs the module card to function as an interpreter configured to interpret the first instruction. The first instruction, when executed by the interpreter, implements the plurality of commands such that the processor functions as a display device configured to display the notification on the display; a receiving device configured to receive an input as a response to the notification; a determining device configured to determine whether the response corresponds to a confirmation to continue services; and a sending device configured to send a second message via the transmitter when the response corresponds to the confirmation to continue services, such that the second message includes the response to the notification.

According to another embodiment of the present invention, a non-transitory, computer-readable medium is configured to store computer-readable instructions that, when executed by a first computer of a portable device including a display, instructs the first computer to perform a method that includes receiving a first message including a notification and a first instruction. The method further includes storing the first message in a memory and executing a second instruction that, when executed by the first computer, instructs the first computer to function as an interpreter configured to interpret the first instruction. The first instruction, when executed by the interpreter, implements a plurality of commands, wherein implementing the plurality of commands causes a second computer to perform the steps of displaying the notification on the display; receiving an input as a response to the notification; determining whether the response corresponds to a confirmation to continue services; and sending a second message the response corresponds to the confirmation to continue services. The second message includes the response to the notification.

According to another embodiment of the present invention, a method for retaining services includes collecting usage data on a service. The usage data includes a last usage time corresponding to a portable device. The method further includes determining a last usage period for the service by the portable device such as a period between the last usage time and a current time. The method further includes determining whether the last usage period is greater than a threshold. In addition, the method includes generating content corresponding to a first message that is sent to the portable device in response to determining that the last usage period is greater than the threshold. The method also includes sending the content to a gateway. The first message includes a notification and a first instruction that, when executed by a first computer, implements a plurality of commands, wherein implementing the plurality of commands causes a second computer to display the notification on a display, receive an input as a response to the notification, determine whether the response corresponds to a confirmation to continue services, and send a second message when the response corresponds to the confirmation to continue service. The second message includes the response to the notification.

Other objects, features, and advantages will be apparent to persons of ordinary skill in the art from the following detailed description and the accompanying drawings.

BRIEF DESCRIPTION OF THE DRAWINGS

For a more complete understanding of the present invention, needs satisfied thereby, and the objects, features, and advantages thereof, reference now is made to the following description taken in connection with the accompanying drawings.

DETAILED DESCRIPTION

Embodiments of the present invention, and their features and advantages, may be understood by referring to FIGS. 1-5, like numerals being used for corresponding parts in the various drawings.

Exemplary embodiments of the present invention provide a method, device, and computer-readable medium for retaining a service, such as might be provided by a service provider over a network. For example, the service comprises a mobile communication service. Users are required to utilize the mobile communication service on a regular basis or within a predetermined time period. For example, as a condition for enrollment to the mobile communication service, users are required to utilize the service once every sixty days. Utilization of the mobile communication service may involve making a call with a mobile device, sending a text message with the mobile device, or receiving a call or a text message with the mobile device; merely having physical possession of the mobile device may not be sufficient. In cases where a user does not utilize the mobile communication service on a regular basis, the present embodiment leverages an application on that user's mobile device. The application may comprise a Wib-based application, a S@T-based application, or a Java-based application. Wib-based applications are applications that are in the form of Wib bytecode; S@T-based applications are applications that are in the form of S@T bytecode; and Java-based applications are applications that are in the form of Java bytecode. Leveraging the application comprises executing the application in a mobile device, which comprises a SIM card or memory that functions as a DSTK interpreter that is configured to execute the application. The DSTK interpreter may comprise Wib, a S@T interpreter, or a Java interpreter based on the leveraged application type. Wib is configured to execute Wib-based applications; a S@T interpreter is configured to execute S@T-based applications; and a Java interpreter is configured to execute Java-based applications. Executing the application implements one or more commands that prompt the mobile device to display an actionable message or notification. In exemplary embodiments of the present invention, the notification asks the user if they would like to continue using the service. When the user responds affirmatively (for example, confirms that they would like to continue receiving the service, such as entering a command), the user's mobile device sends a text message with the confirmation to the service provider and the service will remain uninterrupted.

Figure 1:
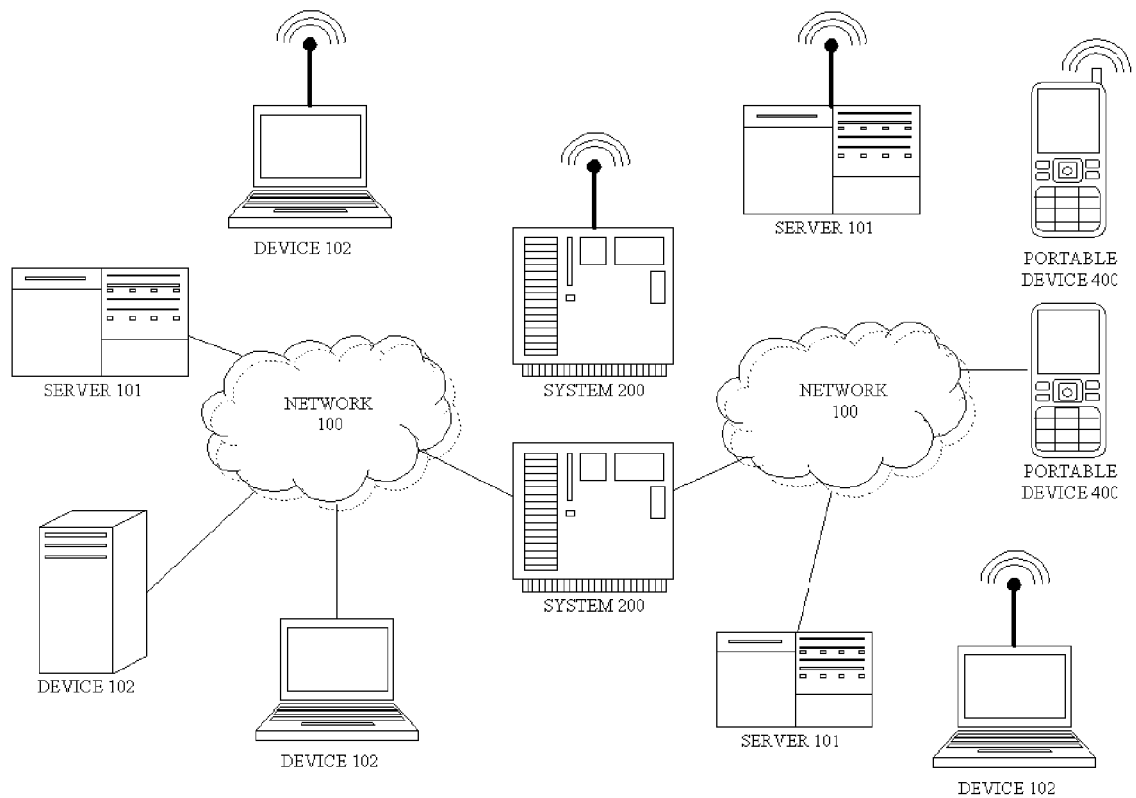
FIG. 1 is a schematic representation of an exemplary environment in which the invention is implemented.

Referring to FIG. 1, a schematic representation of an exemplary embodiment of the present invention will be described. The environment comprises one or more network(s) 100. Network 100 is at least one of a wireless network, a wired network, a local area network (LAN), a wide area network (WAN), an over-the-air (OTA) network, a telecommunication network, and a mobile communication network. One or more servers 101 and other network entities operated by service providers, information providers, users, and other parties is connected to network 100; one or more devices 102 utilized by service providers, information providers, users, and other parties is also connected to network 100; and one or more portable devices 400 utilized by users is also connected to network 100. Service providers and information providers provide services and information to other parties utilizing network 100 and servers 101, devices 102, and portable devices 400 that are connected to network 100. The services comprise communication services (for example, wired communications services, wireless communications services, electronic communications services), portable device services (for example, mobile device distributing services, mobile device provisioning services), module card services (for example, SIM card distributing services, SIM card provisioning services, SIM card activation services), or other services (for example, retention services, positioning services, billing services, security services, customer care services, language services, travel services, software update services).

Servers 101 comprise one or more of general purpose computing devices, specialized computing devices, mainframe devices, wired devices, wireless devices, monitoring devices, infrastructure devices, and other devices configured to provide one or more of services and information to service providers, users, and other parties. Devices 102 comprise one or more of general purpose computing devices, specialized computing devices, mainframe devices, mobile devices, wired devices, wireless devices, monitoring devices, infrastructure devices, and other devices utilized by service providers, information providers, users, and other parties. Portable devices 400 comprise mobile devices, wired devices, wireless devices, handheld devices, and other portable devices utilized by users. Severs 101 and devices 102 may monitor portable devices 400 and collect information from or about portable devices 400 that are connected to network 100 and users utilizing portable devices 400 that are connected to network 100.

Moreover, a system 200 is also connected to networks 100. System 200 comprises one or more of a general purpose computing device, a specialized computing device, a mainframe device, a wired device, a wireless device, a monitoring device, an infrastructure device, and any other device configured collect variable data from one or more data sources (for example, servers, sensors, networks, interfaces, other devices). System 200, amongst other activities, monitors servers 101, devices 102, portable devices 400, and other devices connected to network 100 for available information from or about portable devices 400 that are connected to network 100 and users utilizing portable devices 400 that are connected to network 100. By collecting information about portable devices 400 and users utilizing portable devices 400, system 200 identifies last usage periods for one or more services. System 200 subsequently determines whether the one or more last usage periods are greater than a threshold, and, if so, generates content corresponding to one or more messages that are sent to portable devices 400 and users that utilize portable devices 400.

In exemplary embodiments of the present invention, system 200, portable devices 400, and some servers 101 and devices 102 are connected to a first network 100 and system 200 and other servers 101 and devices 102 are connected to a second network 100. For example, system 200, a portable device 400, a first server 101, and a second server 101 are connected to the first network 100. In such embodiments, a service provider may utilize a first network 100 and a second network 100 to provide a service to a user utilizing the portable device 400. Exemplary embodiments provide for the first server 101 to comprise a monitoring device configured to collect usage data on the service. System 200 monitors the first server 101 for information about a particular portable device 400 and the user. The particular portable device 400 stores, amongst other data, usage data on the service comprising a last usage time corresponding to the user. System 200 collects the usage data on the service from portable device 400 and uses the usage data to determine a last usage period of the user by assessing the period of time between the last usage time and the current time. System 200 subsequently determines whether the last usage period is greater than or equal to a threshold, and, if so, generates content corresponding to a first message (described below) that is sent to the user. System 200 subsequently sends the content to the second server 101. The second server 101 then uses the content to prepare the first message and sends the first message to the user.

In exemplary embodiments, the second server 101 is known as the Universal Gateway ("UG"). Exemplary embodiments also provide for a third server 101, which, along with system 200, connects to the second network 100. The third server 101 corresponds to the service provider. After system 200 sends the content to the second server 101, system 200 receives a second message (described below) from the user. System 200 then sends the second message to the third server 101. In this example, system 200 comprises middleware between the portable device 400, which is utilized by the user, and the third server 101. This middleware is known as the Retention Middleware ("RM").

In exemplary embodiments, system 200 includes one or more of servers 101 and devices 102. In other exemplary embodiments, system 200 is separate from servers 101 and devices 102. In certain exemplary embodiments, one or more devices 102 are portable devices 400. In still other exemplary embodiments, portable devices 400 are separate from devices 102.

Figure 2:
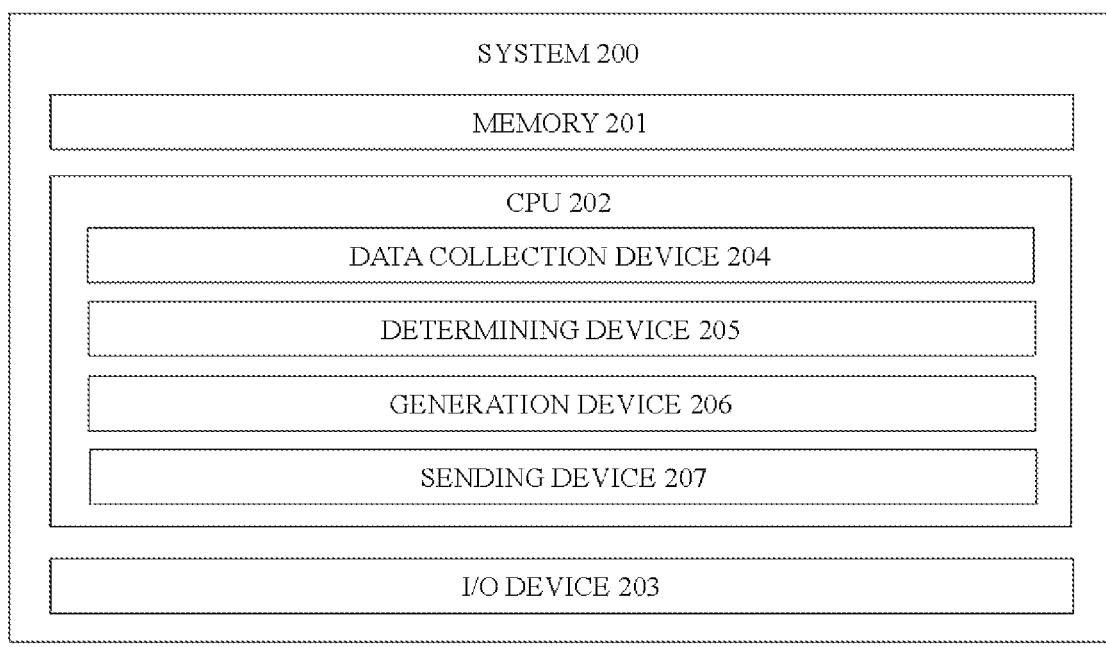
FIG. 2 is a schematic representation of an exemplary system configured to retain services.

Referring to FIG. 2, system 200, which collects usage data on a service, determines a last usage period for the service, determines whether the last usage period is greater than a threshold, generates content corresponding to a first message that is sent to a portable device in response to determining that the last usage period is greater than a threshold, and sends the content to a gateway, is described. System 200 comprises a memory 201, a central processing unit ("CPU") 202, and an input and output ("I/O") device 203. Memory 201 stores computer-readable instructions that instruct system 200 to perform certain processes. In particular, when executed by CPU 202, the computer-readable instructions stored in memory 201 instruct CPU 202 to operate as one or more of a data collection device 204, a determining device 205, a generation device 206, and a sending device 207. In particular exemplary embodiments, one or more of data collection device 204, determining device 205, generation device 206, and sending device 207 are located in remote or local devices.

I/O device 203 receives one or more of data from network 100, data from other devices and sensors connected to system 200, and input from a user and provides such information to CPU 202. I/O device 203 also transmits or sends data to other devices connected to network 100 and sends a notification to a user. Further, I/O device 203 implements one or more of wireless and/or wired communications between system 200 and other devices.

Figure 3:
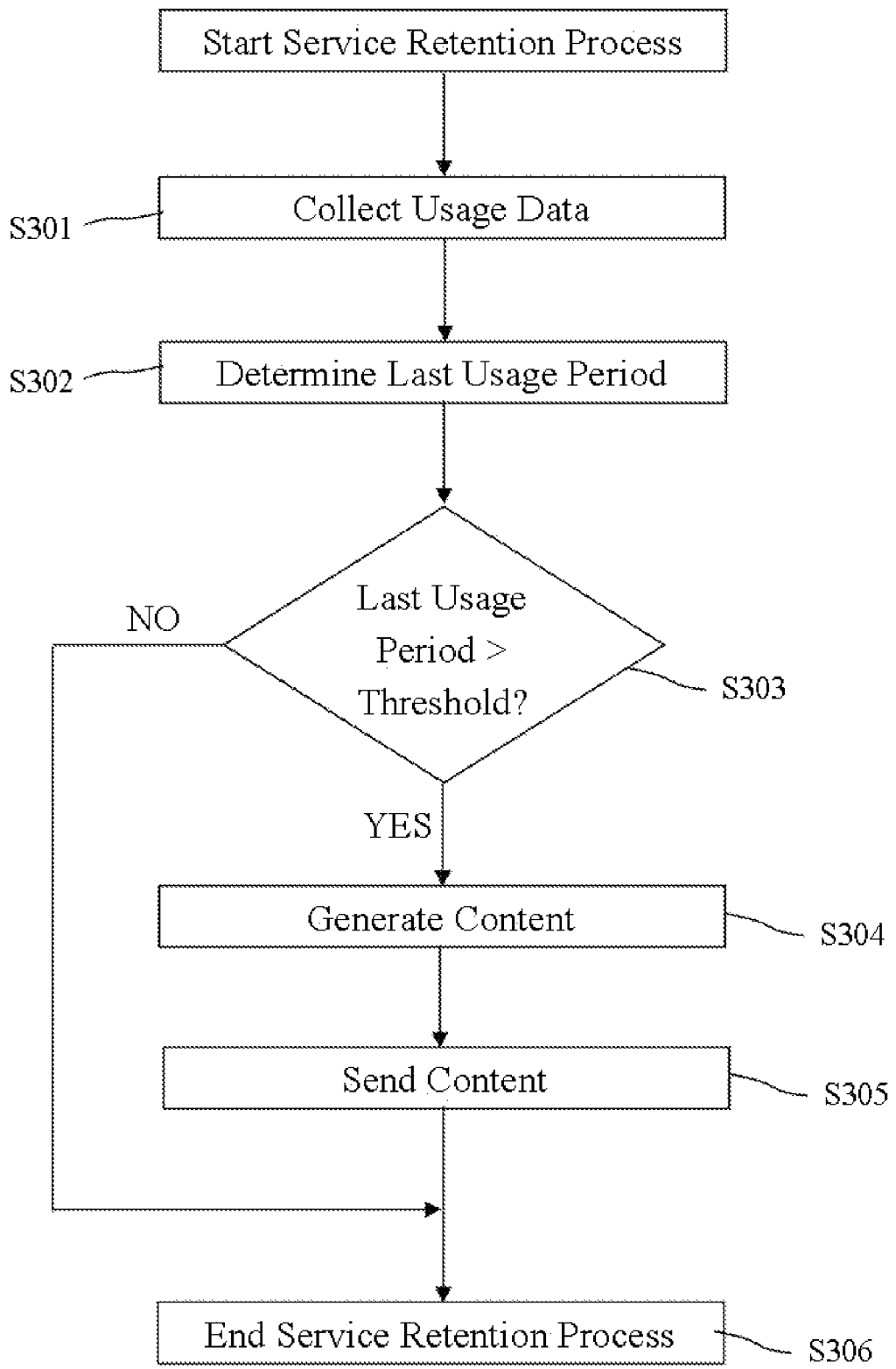
FIG. 3 presents a flow chart showing a method for retaining services according to an embodiment of the invention.

Referring now to FIG. 3, an exemplary process performed by data collecting device 204, determining device 205, generation device 206, and sending device 207 is described. FIG. 3 shows a process for retaining services, starting at S300. In S301, data collection device 204 may collect usage data on a service, such usage data comprising a last usage time of a portable device 400. For example, the service comprises at least one of a communication service (for example, a wireless communication service), a portable device service (for example, a mobile device distributing service), a module card service (for example, a SIM card distributing service, a SIM card provisioning service), or other such services. The service may be provided by one or more service providers, such as wireless carriers, wireless resellers, portable device suppliers, SIM card suppliers, or private label resellers or Mobile Virtual Network Operators ("MVNO"). The last usage time is a time that a user last used the service on the portable device 400, such as a time of day (for example, 1:00 p.m., 13:00) and a month and day of a year (for example, Nov. 15, 2012). In S302, determining device 205 determines a last usage period for the service, such as the period between the last usage time and a current time (for example, the time that the last usage period for the service is currently being determined). Similar to the last usage time, the current time includes, for example, a time of day (for example, 1:00 p.m., 13:00) or a month and day of a year (for example, Nov. 30, 2012). The period between the last usage time and the current time is determined as the amount of time that has elapsed between the last usage time and the current time, a number of days that has elapsed between the last usage time and the current time, a number of months that has elapsed between the last usage time and the current time, or other numeric expression of time that has elapsed between the last usage time and the current time. Continuing from the examples above, when the last usage time is "1:00 p.m., Nov. 15, 2012" and the current time is "1:00 p.m., Nov. 30, 2012," determining device 205 would determine that the last usage period is 360 hours or, alternatively, fifteen days. As another example, when the last usage time is "1:00 p.m., Jul. 20, 2012" and the current time is "1:00 p.m., Nov. 20, 2012," determining device 205 would determine that the last usage period is 123 days or, alternatively, four months.

Subsequently, in S303, determining device 205 determines whether the last usage period is greater than a threshold. The threshold is a predetermined value, such as an amount of time, a number of days, a number of months, or other numeric expression of a period of time. When determining device 205 determines that the last usage period is greater than the threshold (S303: YES), the process proceeds onto S304 to Generate Content. For example, continuing from the last example, the threshold may be sixty days or, alternatively, two months. When determining device 205 determines that the last usage period, 123 days or four months, is greater than the threshold, then the process proceeds onto S304. When determining device 205 determines that the last usage period is not greater than the threshold (S303: NO), the process terminates at S306.

In S304, generation device 206 generates content corresponding to a first message that is sent to the user in response to determining that the last usage period is greater than the threshold. The content may be written in any language that would be known to those of ordinary skill in the art, such as, for example, a markup language. Markup languages comprise, for example, WIG WML, S@TML, and JavaML. The first message comprises a notification and a first instruction. The notification comprises a retention question that asks the user whether he or she would like to retain or continue receiving the service. For example, if a user is receiving a wireless communication service from a wireless carrier referred to as "A," the first message might read: "Would you like to continue receiving A's wireless communication service?" The first instruction, when interpreted and executed by a first computer, implements a plurality of commands. The first instruction comprises an application. For example, in a GSM network, the first instruction comprises a wiblet, a s@tlet, or a Java applet. The wiblet is a small application that is Wib-based; the s@tlet is a small application that is S@T-based; and the Java applet is a small application that is Java-based. As described above, a Wib-based application is an application that is in the form of Wib bytecode and is executed by Wib (e.g., a Wib interpreter); a S@T-based application is an application that is in the form of S@T bytecode and is executed by a S@T interpreter; and a Java-based application is an application that is in the form of Java bytecode and is executed by a Java interpreter.

Implementing the plurality of commands causes a second computer to display the notification. The first and second computers are either physical entities (for example, a portable device, a module card) or logical entities (for example, a process, a program, a service, a virtual machine). The first computer, for example, is a module card that functions as an interpreter. The interpreter is at least one of Wib, a S@T interpreter, or a Java interpreter. Displaying the notification comprises displaying the notification on a display (for example, a visual display or a tactile display). Implementing the plurality of commands also causes the second computer to receive an input as a response to the notification. The input may comprise a text input, such as affirmation language (for example, "Y," "Yes," "Sure," "Why Not," "Yea," "Yeah," "Yup," "Go for it") or declination language (for example, "Nah," "Nope," "Negative"), or a selection of a presented option (for example, a selection of button or key representing an affirmation, a selection of a key representing an declination). Implementing the plurality of commands further causes the second computer to send a second message comprising the response to the notification. The second message is received by the service provider. The second message comprises the response to the notification in, for example, a 7-bit Short Message Service ("SMS") message, an 8-bit SMS message, a Unstructured Supplementary Service Data ("USSD") message, or other type of cellular network message.

In certain exemplary embodiments, displaying the notification comprises displaying the notification on the display to cover an item (for example, an application, an image, a message, a file, and data) previously displayed on the display. In other exemplary embodiments, sending the second message comprises sending the second message to a network entity (for example, a node, a link, a server, or other active element in a network). In still other exemplary embodiments, implementing the plurality of commands causes the second computer to further determine whether the response corresponds to a confirmation to continue services and to send the second message when the response corresponds to the confirmation to continue services. The confirmation to continue services may be a predetermined value, such as a text value (for example, "Y", "Yes") or a numerical value, or a predetermined signal (for example, a particular type of pulse).

In particular exemplary embodiments, the first computer and the second computer are located in a single device, such that, for example, and the first computer is a module card that is located a portable device 400, and the second computer is a processor located in the same device. In other exemplary embodiments, the first and second computers are provided in more than one device.

In S305, sending device 207 sends the content to a gateway known as the UG. After receiving the content, the gateway prepares the first message and sends the first message to the portable device 400 corresponding to the user. In a GSM network, for example, the first message comprises the notification and the first instruction in at least one of a 7-bit SMS message, an 8-bit SMS message, a USSD message, or other type of cellular network message. Preparing the first message comprises converting the content and encoding the converted content in a type of message. For example, when sending device 307 sends content that is written in WIG WML to the gateway, the gateway prepares a first message by converting the content into Wib bytecode and encoding the converted content in a 7-bit SMS message. Alternatively, when sending device 307 sends content that is written in S@TML to the gateway, the gateway prepares the first message by converting the content into S@T bytecode and encoding the converted content in a 7-bit SMS message. In both of these examples, the 7-bit SMS message or first message are subsequently sent to the portable device. The portable device, as described below, may comprise a module card. The module card may function as an interpreter that is configured to interpret the first instruction. In a GSM network, for example, the portable device comprises a SIM card, wherein the SIM card functions as a DSTK interpreter. In such configurations, the DSTK interpreter is at least one of Wib, a S@T interpreter, or a Java interpreter.

Figure 4:
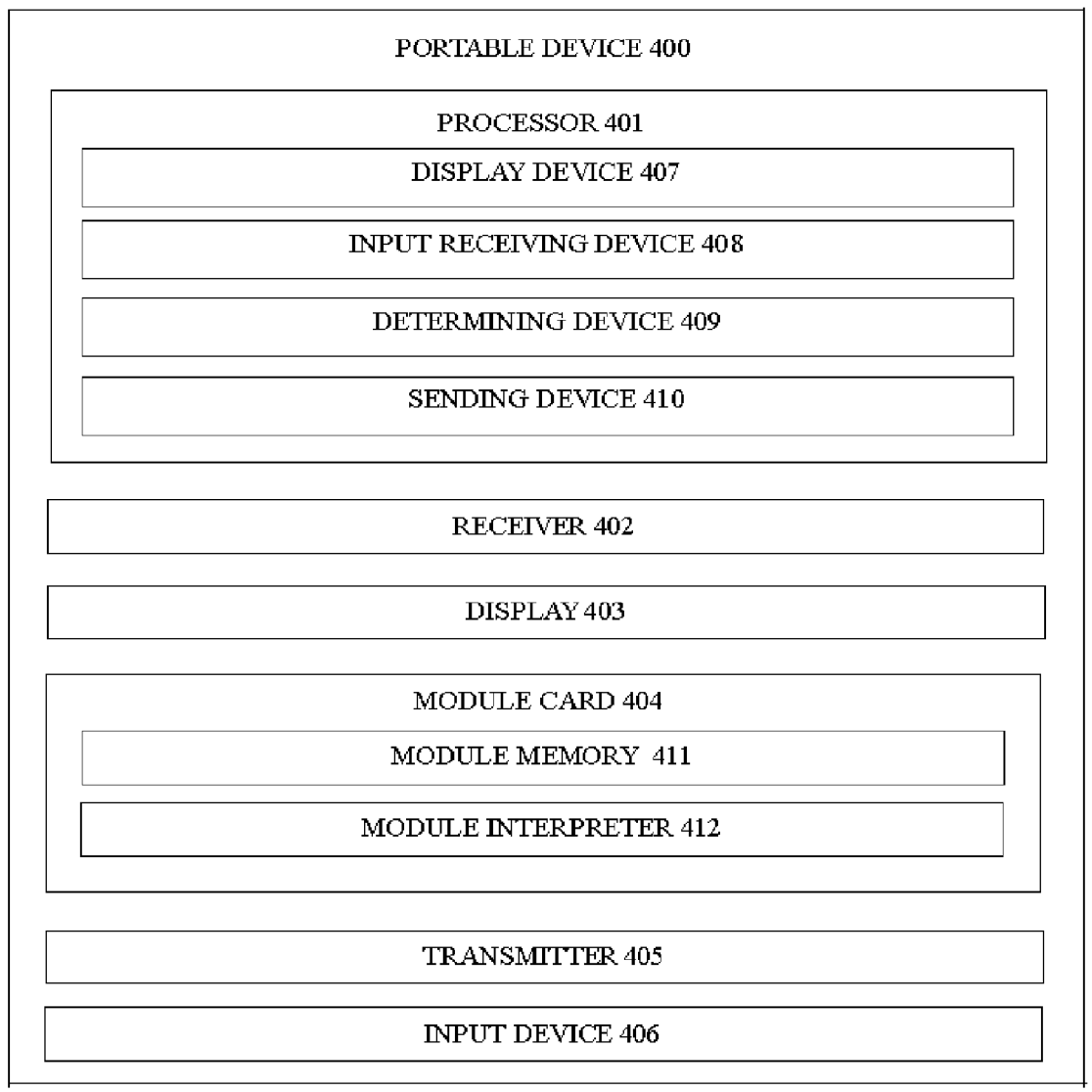
FIG. 4 is a schematic view of a portable device according to an embodiment of the invention.

Referring to FIG. 4, portable device 400, which is configured to retain services, is described. Portable device 400 comprises a processor 401, a receiver 402, a display 403, a module card 404, a transmitter 405, and an input device 406. Module card 403 comprises a module memory 411. Module memory 411 stores a second instruction that, when executed by module card 404, instructs module card 404 to operate as a module interpreter 412. Receiver 402 receives a first message, wherein the first message comprises a notification and a first instruction. The first message is sent by a service provider. As described above, the first message comprises the notification and the first instruction in at least one of a 7-bit SMS message, an 8-bit SMS message, a USSD message, or other type of cellular network message. The notification is a retention question that asks the user whether he or she would like to retain or continue receiving the service. The first instruction comprises an application. For example, in a GSM network, the first instruction comprises a wiblet, a s@tlet, or a Java applet. The service provider comprises at least one of a wireless carrier, a wireless reseller, a portable device supplier, a SIM card supplier, and a MVNO. In certain exemplary embodiments, receiver 402 receives the first message from a network entity (for example, a node, a link, a server, or other active element in a network).

Module memory 411 stores the first message. Module memory also stores a toolkit. The toolkit comprises the plurality of commands. Module interpreter 412 is configured to interpret the first instruction. The first instruction, when interpreted and executed by module interpreter 412, implements a plurality of commands. In particular, implementing the plurality of commands causes processor 401 to operate as one or more of a display device 407, an input receiving device 408, a determining device 409, and a sending device 410.

Display device 407 is configured to display the notification on display 403. Display 403 comprises, for example, a visual display or a tactile display. In certain exemplary embodiments, display device 407 is configured to display the notification such that the notification covers an item previously displayed on display 403. As described above, the item comprises, for example, an application, an image, a message, a file, and data. Input receiving device 408 is configured to receive an input (for example, a text input) as a response to the notification. The user may use input device 406 to provide the input. Input device 406 comprises, for example, an alphanumeric keypad or other input source.

Subsequently, determining device 409 is configured to determine whether the response corresponds to a confirmation to continue services. Further, sending device 410 is configured to send a second message using transmitter 405 when the response corresponds to the confirmation to continue services (for example, a predetermined value such as a text value). Similar to the first message, the second message comprises the response to the notification in at least one of a 7-bit SMS message, an 8-bit SMS message, a USSD message, or other type of cellular network message. As described above, the confirmation to continue services is a predetermined value such as a text value, a numeric value, or a predetermined signal.

In certain exemplary embodiments, portable device 400 does not function as a determining device 409. In particular, in such exemplary embodiments, input receiving device 408 receives an input as a response to the notification, and sending device 410 subsequently sends the second message using transmitter 405. The second message is received by the service provider. In other exemplary embodiments, sending device 410 sends the second message to a network entity corresponding to a service provider. As described above, the network entity is, for example, a node, a link, a server, or other active element in a network.

Figure 5:
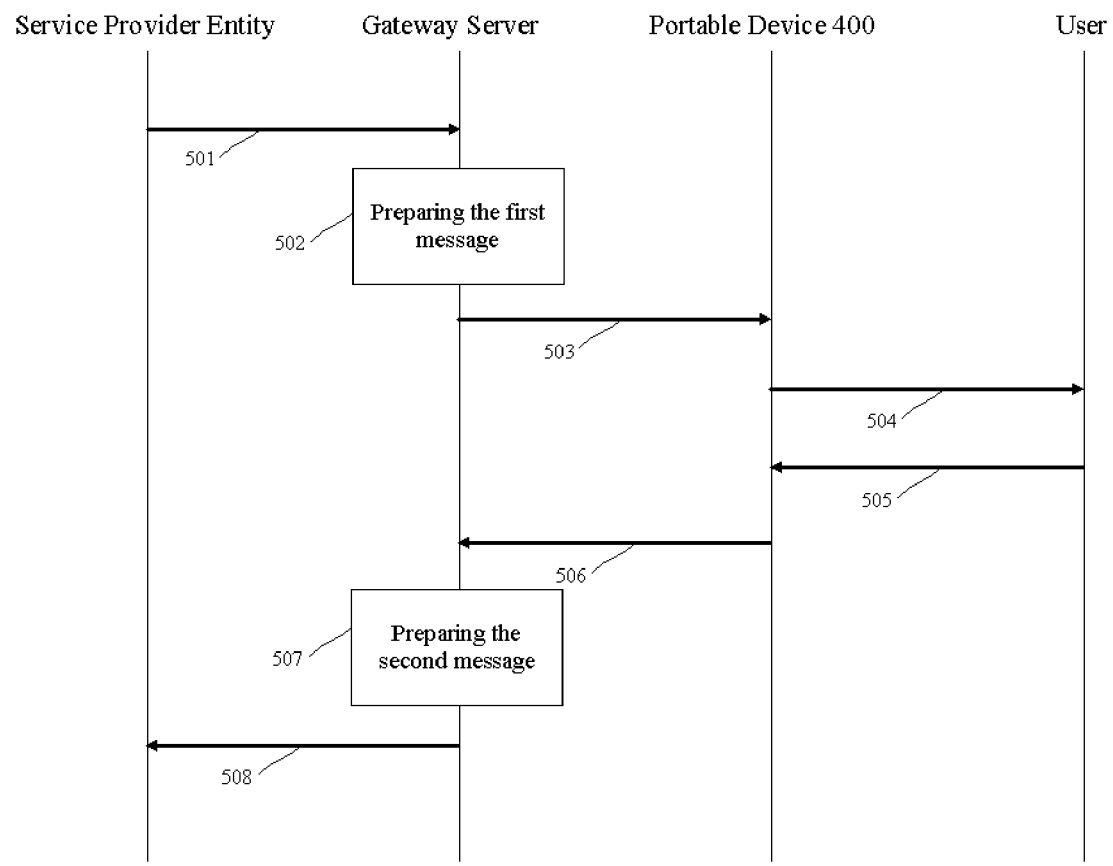
FIG. 5 presents a flow chart illustrating an embodiment of the invention.

Referring to FIG. 5, a flow chart of a particular embodiment of the invention is described. This embodiment of the invention takes place in the environment in accordance with FIG. 1 with networks 100, servers 101, devices 102, system 200, and portable devices 400. In particular, the environment comprises a first network 100, a server 101, system 200, and a portable device 400. The portable device 400 and the server 101 are connected to the first network 100. System 200 and the server 101 are connected to the second network 100. The portable device 400 is utilized by a user. System 200 is a network entity that corresponds to a service provider; thus, system 200 is referred to as a "Service Provider Entity" ("SP"). The server 101 is a gateway; thus, the server 101 may be referred to as a "Gateway Server" ("GS"). The first network 100 is a GSM network; and the second network 100 is a computer network. The computer network may have a network protocol such as Hypertext Transfer Protocol ("HTTP") or Short Message Peer-to-Peer ("SMPP").

The SP monitors other servers 101 and devices 102 that are connected to the GSM network and the computer network for information about the portable device 400 and the user. The information comprises usage data on a service. The service may be provided by the service provider or another party (for example, a service provider other than the service provider). By collecting the usage data on the service, system 200 determines a last usage period for the service, in which the last usage period comprises a period between the last usage time and a current time. System 200 subsequently determines whether the last usage period is greater than a threshold, and when it determines that the last usage period is greater than the threshold, system 200 generates content corresponding to a first message. As described above, the content may be written in a markup language, such as, for example, one or more of WIG WML, S@TML, and JavaML. Signal 501 represents this content.

In FIG. 5, signal 501 is sent from system 200 to the GS over the computer network. The GS prepares the first message and sends the first message to the portable device 400. The first message comprises a notification and a first instruction in at least one of a 7-bit SMS message, an 8-bit SMS message, a USSD message, or other type of cellular network message. As described above, the notification contained in the first message comprises a retention question that asks the user whether he or she would like to retain or continue receiving the service, and the first instruction comprises an application (for example, a wiblet, a s@tlet, or a Java applet). A wiblet is an application that is in the form of Wib bytecode; a s@tlet is an application that is in the form of S@T bytecode; and a Java applet is an application that is in the form of Java bytecode.

In step 502, the GS prepares the first message. Preparing the first message comprises converting Signal 501 into a portable code or bytecode and encoding the converted signal in a type of message. The bytecode is, for example, Wib bytecode, S@T bytecode, and Java bytecode. Specifically, when signal 501 is written in WIG WML, the GS converts signal 501 into Wib bytecode and encodes the converted signal in a SMS message or USSD message. Alternatively, when signal 501 is written in S@TML, the GS converts signal 501 into S@T bytecode and encodes the converted signal in a SMS message or USSD message. Alternatively, when signal 501 is written in JavaML, the GS converts signal 501 into Java bytecode and encodes the converted signal in a SMS message or USSD message. The SMS message or USSD message after encoding may be the first message. Signal 503 represents this first message.

In FIG. 5, signal 503 is sent from the GS to the portable device 400 over the GSM network. The portable device 400 comprises a receiver, a processor, a display, a module card, and a transmitter. The module card comprises a memory that is configured to store signal 503. The memory is configured to also store a toolkit and a second instruction. The toolkit comprises a plurality of commands. The module card executes the second instruction and function as an interpreter that is configured to interpret and execute the first instruction, such that executing the first instruction implements the plurality of commands. In certain exemplary embodiments, the portable device 400 comprises a module card that is a SIM card, in which a toolkit, such as a DSTK, is stored. Accordingly, the interpreter is a DSTK interpreter (for example, Wib, a S@T interpreter, a Java interpreter), and executing the first instruction implements a plurality of commands, such as Display-Text, GetInput, and SendShortMessage.

Implementing the plurality of commands causes the processor in the portable device 400 to function as a display device, a receiving device, and a sending device. Specifically, implementing DisplayText causes the processor to function as the display device, so that the display device displays the notification on the display. Signal 504 represents the message that is displayed to the user. Implementing GetInput causes the processor to function as the receiving device, so that the receiving device receives an input as a response to the notification. Signal 505 represents the input that is received from the user. And, implementing SendShortMessage causes the processor to function as the sending device that sends a second message using the transmitter over the GSM network. The second message is the response to the notification. As described above, the second message comprises the response to the notification in at least one of a 7-bit SMS message, an 8-bit SMS message, a USSD message, or other type of cellular network message. The processor in portable device 400 sends the second message to the GS over the GSM network, for example. Signal 506 carries this second message.

In step 507, the GS prepares the second message. Preparing the second message comprises converting Signal 506 into any language as would be known to those of ordinary skill in the art, such as a markup language. In certain exemplary embodiments, the markup language is HyperText Markup Language ("HTML"). The GS subsequently sends the second message to the SP over the computer network. Signal 508 carries this second message.

While the invention has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. The specification and the described examples are considered as exemplary only, with the true scope and spirit of the invention indicated by the following claims.

What is claimed is:

1. A portable device comprising:
   a receiver configured to receive a first message, the first message comprising a notification and a first instruction;
   a processor;
   a transmitter;
   a display; and
   a module card comprising a memory, the memory configured to store:
      the first message;
      a toolkit comprising a plurality of commands; and
      a second instruction that, when executed by the module card, instructs the module card to function as an interpreter configured to interpret the first instruction,
   wherein the first instruction, when executed by the interpreter, implements the plurality of commands, such that the processor functions as:
      a display device configured to display the notification on the display;
      a receiving device configured to receive an input as a response to the notification;
      a determining device configured to determine whether the response corresponds to a confirmation to continue services; and
      a sending device configured to send a second message using a mobile telecommunications service via the transmitter when the response corresponds to the confirmation to continue services, the second message comprising the response to the notification,
   wherein the notification is a question for retaining the mobile telecommunications service,
   wherein the mobile telecommunications service comprises at least one of: a voice service, a data service, and a messaging service,
   wherein sending the second message signals to a service provider that the portable device has used the mobile telecommunications service to meet predetermined criteria for retaining the telecommunications service, and
   wherein the predetermined criteria are met when the portable device has used the telecommunications service a predetermined number of times within a predetermined period of time.

2. The portable device of claim 1, wherein the first message includes the notification and the first instruction in a 7-bit Short Message Service ("SMS") message; and
   wherein the second message includes the response to the notification in at least one of a 7-bit SMS message and an 8-bit SMS message.

3. The portable device of claim 1, wherein the first instruction comprises a s@tlet;
   wherein the module card is a Subscriber Identity Module ("SIM") card;
   wherein the toolkit is a Dynamic SIM Toolkit ("DSTK"); and
   wherein the interpreter is a DSTK interpreter that is a SIM @lliance Toolbox ("S@T") interpreter.

4. The portable device of claim 1, wherein the display device is configured to display the notification such that the notification covers an item previously displayed on the display.

5. The portable device of claim 1, wherein the receiver is configured to receive the first message from a network entity; and
   wherein the sending device is configured to send the second message via the transmitter to the network entity.

6. The portable device of claim 1, wherein the first instruction comprises a wiblet;
   wherein the module card is a Subscriber Identity Module ("SIM") card;
   wherein the toolkit is a Dynamic SIM Toolkit ("DSTK"); and
   wherein the interpreter is a DSTK interpreter that is a SmartTrust Wib ("Wib") interpreter.

7. A non-transitory, computer-readable medium configured to store computer-readable instructions that, when executed by a first computer of a portable device comprising a display, instruct the first computer to perform a method comprising:
   receiving a first message, wherein the first message comprises a notification and a first instruction;
   storing the first message in a memory; and
   executing a second instruction that, when executed by the first computer, instructs the first computer to function as an interpreter configured to interpret the first instruction;
   wherein the first instruction, when executed by the interpreter, implements a plurality of commands;
   wherein implementing the plurality of commands causes a second computer to:
      display the notification on the display;
      receive an input as a response to the notification;
      determine whether the response corresponds to a confirmation to continue services; and
      send a second message using a mobile telecommunications service when the response corresponds to the confirmation to continue services, the second message comprising the response to the notification,
   wherein the notification is a question for retaining the mobile telecommunications service, wherein the mobile telecommunications service comprises at least one of: a voice service, a data service, and a messaging service, wherein sending the second message signals to a service provider that the portable device has used the mobile telecommunications service to meet predetermined criteria for retaining the telecommunications service, and wherein the predetermined criteria are met when the portable device has used the telecommunications service a predetermined number of times within a predetermined period of time.

8. The non-transitory, computer-readable medium according to claim 7, wherein the first message includes the notification and the first instruction in a 7-bit SMS message; and wherein the second message includes the response to the notification in at least one of a 7-bit SMS message and an 8-bit SMS message.

9. The non-transitory, computer-readable medium according to claim 7, wherein the first computer comprises a module card, the module card is a SIM card;

wherein the interpreter is a DSTK interpreter that is a S@T interpreter;

wherein the first instruction comprises a s@tlet; and wherein the memory is a memory on the module card.

10. The non-transitory, computer-readable medium of claim 7, wherein displaying the notification comprises displaying the notification on the display to cover an item previously displayed on the display.

11. The non-transitory, computer-readable medium of claim 7, wherein receiving the first message comprises receiving the first message from a network entity; and wherein sending the second message comprises sending the second message to the network entity.

12. The non-transitory, computer-readable medium according to claim 7, wherein the first computer comprises a module card, the module card is a SIM card;

wherein the interpreter is a DSTK interpreter that is a Wib interpreter;

wherein the first instruction comprises a wiblet; and wherein the memory is a memory on the module card.

13. A method for retaining services comprising:

collecting usage data on a mobile telecommunications service, wherein the usage data comprises a last usage time corresponding to a portable device;

determining a last usage period for the mobile telecommunications service by the portable device, wherein the last usage period comprises a period between the last usage time and a current time;

determining whether the last usage period is greater than a threshold;

generating content corresponding to a first message that is sent to the portable device in response to determining that the last usage period is greater than the threshold, the first message comprising a notification and a first instruction, the first instruction, when executed by a first computer, implementing a plurality of commands; and sending the content to a gateway, wherein implementing the plurality of commands causes a second computer to perform the steps of:

displaying the notification on a display;

receiving an input as a response to the notification;

determining whether the response corresponds to a confirmation to continue services; and sending a second message using the mobile telecommunications service when the response corresponds to the confirmation to continue services, wherein the second message comprises the response to the notification;

collecting additional usage data on the mobile telecommunications service, the additional usage data including a sending time of the second message such that the last usage time is updated to be the sending time of the second message; and updating the last usage period to be a period between the sending time of the second message and an updated current time; and determining, based on the updated last usage time, that the portable device has used the mobile telecommunications service to meet predetermined criteria for retaining the telecommunications service, wherein the notification is a question for retaining the mobile telecommunications service, and wherein the mobile telecommunications service comprises at least one of: a voice service, a data service, and a messaging service.

14. The method according to claim 13, wherein the first message includes the notification and the first instruction in a 7-bit SMS message; and wherein the second message includes the response to the notification in at least one of a 7-bit SMS message and an 8-bit SMS message.

15. The method of claim 13, wherein the first instruction comprises a s@tlet;

wherein the first computer comprises a module card, the module card being a SIM card; and wherein the SIM card functions as an interpreter, the interpreter being a DSTK interpreter that is a S@T interpreter.

16. The method of claim 13, wherein displaying the notification comprises displaying the notification on the display to cover an item previously displayed on the display.

17. The method of claim 13, wherein sending the second message comprises sending the second message to a network entity.

18. The method of claim 13, wherein the first instruction comprises a wiblet;

wherein the first computer comprises a module card, the module card being a SIM card; and wherein the SIM card functions as an interpreter, the interpreter being a DSTK interpreter that is a Wib interpreter.

19. The method of claim 13, wherein the predetermined criteria are met when the portable device has used the telecommunications service a predetermined number of times within a predetermined period of time.

* * * * *